United States Patent
Johanson et al.

(10) Patent No.: US 11,400,689 B2
(45) Date of Patent: Aug. 2, 2022

(54) TAPE-LIKE DRY FIBROUS REINFORCEMENT

(71) Applicant: TAPE WEAVING SWEDEN AB, Borås (SE)

(72) Inventors: Mats Johanson, Fristad (SE); Oskar Sjöstedt, Gothenburg (SE); Fredrik Ohlsson, Rävlanda (SE)

(73) Assignee: TAPE WEAVING SWEDEN AB, Borås (SE)

( * ) Notice: Subject to any disclaimer, the term of this patent is extended or adjusted under 35 U.S.C. 154(b) by 442 days.

(21) Appl. No.: 15/526,621

(22) PCT Filed: Nov. 17, 2015

(86) PCT No.: PCT/EP2015/076842
§ 371 (c)(1),
(2) Date: May 12, 2017

(87) PCT Pub. No.: WO2016/079130
PCT Pub. Date: May 26, 2016

(65) Prior Publication Data
US 2017/0320293 A1    Nov. 9, 2017

(30) Foreign Application Priority Data

Nov. 21, 2014 (EP) .................................. 14194313

(51) Int. Cl.
*B32B 7/14* (2006.01)
*B32B 7/03* (2019.01)
(Continued)

(52) U.S. Cl.
CPC ................ *B32B 7/14* (2013.01); *B29B 15/12* (2013.01); *B29C 70/20* (2013.01); *B32B 3/085* (2013.01);
(Continued)

(58) Field of Classification Search
CPC .. B32B 7/14; B32B 7/03; B32B 15/12; B32B 5/022; B32B 5/06; B32B 5/08; B32B 3/085; B29C 70/20
(Continued)

(56) References Cited

U.S. PATENT DOCUMENTS

| | | | |
|---|---|---|---|
| 4,460,633 A | 7/1984 | Kobayashi et al. | |
| 6,238,761 B1 | 5/2001 | Jeong et al. | |

(Continued)

FOREIGN PATENT DOCUMENTS

| | | |
|---|---|---|
| CN | 1860016 A | 11/2006 |
| EP | 0 081 843 A2 | 5/1983 |

(Continued)

OTHER PUBLICATIONS

English translation of WO 2013133437 (Year: 2013).*
(Continued)

*Primary Examiner* — Vincent Tatesure
(74) *Attorney, Agent, or Firm* — Buchanan Ingersoll & Rooney P.C.

(57) ABSTRACT

A tape-like dry fibrous reinforcement, the 'Gapped UD reinforcement tape', providing channels or flow-paths created by inclusion of a layer of separated fiber tows held by at least one adhesive layer. Hereby, quicker wetting of fibers with matrix is obtained, whereby improved composite materials can be economically produced. A method and apparatus for producing the Gapped UD tapes are also disclosed.

18 Claims, 4 Drawing Sheets

(51) Int. Cl.
- *B29C 70/20* (2006.01)
- *B29B 15/12* (2006.01)
- *B32B 5/02* (2006.01)
- *B32B 5/06* (2006.01)
- *B32B 5/08* (2006.01)
- *B32B 3/08* (2006.01)
- *B32B 5/26* (2006.01)
- *B32B 7/12* (2006.01)

(52) U.S. Cl.
CPC .............. *B32B 5/02* (2013.01); *B32B 5/022* (2013.01); *B32B 5/06* (2013.01); *B32B 5/08* (2013.01); *B32B 5/26* (2013.01); *B32B 7/03* (2019.01); *B32B 7/12* (2013.01); *B32B 2260/023* (2013.01); *B32B 2260/046* (2013.01); *B32B 2262/02* (2013.01); *B32B 2262/0253* (2013.01); *B32B 2262/0261* (2013.01); *B32B 2262/0269* (2013.01); *B32B 2262/0276* (2013.01); *B32B 2262/0292* (2013.01); *B32B 2262/101* (2013.01); *B32B 2262/105* (2013.01); *B32B 2262/106* (2013.01); *B32B 2262/14* (2013.01); *B32B 2419/00* (2013.01); *B32B 2571/02* (2013.01); *B32B 2605/00* (2013.01); *B32B 2605/08* (2013.01); *B32B 2605/12* (2013.01); *B32B 2605/18* (2013.01)

(58) Field of Classification Search
USPC .......................................................... 442/149
See application file for complete search history.

(56) References Cited

U.S. PATENT DOCUMENTS

| | | | |
|---|---|---|---|
| 6,503,856 B1 * | 1/2003 | Broadway | B29B 15/122 442/366 |
| 6,539,983 B2 | 4/2003 | Khokar | |
| 8,372,231 B1 | 2/2013 | Tsotsis | |
| 2005/0070182 A1 | 3/2005 | Dunn | |
| 2006/0089068 A1 | 4/2006 | Hartman et al. | |
| 2012/0100334 A1 | 4/2012 | Adams et al. | |
| 2013/0108823 A1 | 5/2013 | Beraud et al. | |
| 2013/0174969 A1 | 7/2013 | Karb et al. | |
| 2014/0057096 A1 * | 2/2014 | Moser | B29C 70/30 428/295.4 |
| 2014/0147620 A1 * | 5/2014 | Li | D04H 3/004 428/114 |
| 2014/0363615 A1 | 12/2014 | Adams et al. | |
| 2014/0370237 A1 | 12/2014 | Ponsolle et al. | |

FOREIGN PATENT DOCUMENTS

| | | |
|---|---|---|
| EP | 1 838 909 B1 | 8/2011 |
| EP | 2 152 454 B1 | 7/2013 |
| JP | H01-218806 A | 9/1989 |
| JP | H05-162126 A | 6/1993 |
| JP | H07-024830 A | 1/1995 |
| JP | 2002-227067 A | 8/2002 |
| JP | 2004-160927 A | 6/2004 |
| JP | 2004-249507 A | 9/2004 |
| JP | 2006-225812 A | 8/2006 |
| JP | 2008-518113 A | 5/2008 |
| JP | 2013-525140 A | 6/2013 |
| WO | WO 2003/064153 A1 | 8/2003 |
| WO | WO 2008/148791 A1 | 12/2008 |
| WO | WO 2011/153543 A1 | 12/2011 |
| WO | 2012/010805 A1 | 1/2012 |
| WO | WO 2012/096209 A1 | 7/2012 |
| WO | WO 2013/096377 A2 | 6/2013 |
| WO | 2013/133437 A1 | 9/2013 |
| WO | WO-2013133437 A1 * | 9/2013 |
| WO | 2015/156861 A2 | 10/2015 |

OTHER PUBLICATIONS

Opposition filed by the Cytec Engineered Materials Inc. against corresponding European Application No. EP14194313.4 on May 31, 2017 (5 pages).

Composites World, "Fabrication methods" Jan. 1, 2014, [cited Feb. 12, 2018] Available from: [https://www.compositesworld.com/blog/post/fabrication-methods], particular relevance: see Facts and arguments, original file name: D5. pdf, attached as: Published-Evidence-5.pdf, 14 pages.

Collins English Dictionary, "Definition of Laminate", HarperCollins Publishers, Feb. 22, 2018, original file name: D7.pdf attached as: Published-Evidence-7.pdf, U.S. Department of Transportation—Federal, 1 page.

U.S. Department of Transportation—Federal Aviation Administration, "Aviation Maintenance Technician Handbook—Airframe" U.S. Department of Transportation—Federal Aviation Administration, 2012, original file name: D8.pdf, attached as: Published-Evidence-8.pdf, 70 pages.

Das, Dipayan et al., "Composite Nonwoven Materials" Woodhead Publishing, Mar. 14, 2014, particular relevance: see Facts and arguments, original file name: D9.pdf, attached as: Published-Evidence-9.pdf, 16 pages.

Office Action (Notification of Reason for Rejection) dated Aug. 30, 2019, by the Japanese Patent Office in corresponding Japanese Patent Application No. 2017-523927 and an English Translation of the Office Action. (13 pages).

Office Action (The Second Office Action) dated Sep. 12, 2019, by the State Intellectual Property Office of the People's Republic of China in corresponding Chinese Patent Application No. 201580062182.8, and an English Translation of the Office Action. (18 pages).

Office Action dated Oct. 18, 2021, by the Canadian Intellectual Property Office in Canadian Patent Application No. 2,967,160, (5 pages).

International Search Report (PCT/ISA/210) dated Dec. 17, 2015, by the European Patent Office as the International Searching Authority for International Application No. PCT/EP2015/076842.

Written Opinion (PCT/ISA/237) dated Dec. 17, 2015, by the European Patent Office as the International Searching Authority for International Application No. PCT/EP2015/076842.

\* cited by examiner

TAPE-LIKE DRY FIBROUS REINFORCEMENT

TECHNICAL FIELD OF THE INVENTION

The present invention relates to a tape-like dry fibrous reinforcement, such as a reinforcement for composite material. It also relates to a method and apparatus for producing such a tape-like dry fibrous reinforcement.

BACKGROUND

Fibrous reinforcements, also known as fiber reinforcements or fiber preforms, are used for forming composite materials, such as fiber-reinforced plastic (FRP), in which the fibrous reinforcement is embedded in a thermoset or thermoplastic matrix, such as epoxy, vinylester or polyester, PEEK and PP. Such composite materials are useful and commonly used in many different applications, such as those of aerospace, aeronautical, automotive, marine, construction industries, ballistic armor and sports equipment.

One type of reinforcements is known as multiaxial reinforcements, or non-crimp fabrics (NCF), made of multiple stacks/plies of parallel fibers, each lying in a different orientation or axis relative to other—hence the term "multiaxial". These layers are typically stabilized by stitch-bonding (usually with a polyester thread) to form a fabric.

In NCFs, and also in many other types of reinforcements, it is sometimes a problem to get layers of certain orientations, such as in the zero degree direction or parallel to the axial direction of the fabric or the taking-up direction during production, since it is difficult to maintain the integrity of such a layer during production.

Further, a general problem in reinforcements of this type is that full stabilization or densely packed fibers in the reinforcement hinders matrix flow, causing inadequate impregnation of fibers, thereby making formation of the composite material difficult or even impossible. Alternatively, in case the multiaxially oriented plies of fibers are not stabilized then the reinforcement becomes difficult to handle, which also makes forming of the composites difficult.

U.S. Pat. No. 6,539,983 by the same applicant discloses a woven fabric, e.g. useable as a reinforcement, and comprising tape-like warps and wefts. In some embodiments, the tapes are provided with a texture, e.g. being perforated or embossed. In other examples, the tapes are provided with one or several layers of fibers.

EP 1 838 909 also by the same applicant discloses a woven reinforcement, produced by use of partially stabilized tape-like warps and wefts. This reinforcement is highly useable, e.g. it provides excellent drapability. Further, EP 2 152 454 discloses a reinforcement having two skins of unidirectional fibers, interconnected by means of an adhesive interlay. However, in many types of reinforcements, such as in the above-discussed NCFs, impregnation, etc. may still be problematic due e.g. to permeability difficulties.

There is therefore a need for an improved tape-like fibrous dry reinforcement, addressing the above-discussed problems, and enabling improved impregnation with resins and/or more orientations in multi-axial structures.

SUMMARY OF THE INVENTION

It is therefore an object of the present invention to provide a tape-like dry fibrous reinforcement, as well as a method and apparatus for its production, which alleviates at least some, and preferably all, of the above-discussed problems.

This object is achieved by means of a reinforcement, a method and an apparatus as defined in the appended claims.

According to a first aspect of the present invention, there is provided a tape-like dry fibrous reinforcement, such as a reinforcement for composite material, comprising at least one fiber/filament layer having a plurality of fibers/filaments arranged in a plurality of substantially unidirectional tows arranged alongside each other, each tow comprising a plurality of substantially unidirectional fibers or filaments, and at least one porous adhesive layer attached to the tows of the at least one fiber/filament layer by surface connection, wherein the tows of the at least one fiber/filament layer are separated from each other by separation channels.

In the context of the present invention a fibrous tape-like reinforcement refers to an arrangement of fibres/filaments wherein the fibers'/filaments' orientation direction is its length direction, the greater lateral direction of the group of fibers/filaments is its width direction, and the smaller lateral direction of the group of fibers/filaments is its thickness direction; the thickness to width ratio being less than 1 and also the length dimension is substantially greater than both the width and the thickness. Further, dry fibrous reinforcement refers to the said tape that is made e.g. using standard fibers as obtained from commercially available bobbins/spools, wherein such fibers have sizing and other surface treatment agents applied on them.

Further, in the context of the present application "tows" refers to a bundle of fibers/filaments, and are typically ordinary tows, but also includes spread tows, flat tows and spread tow tapes. All of these will in the following be referred to as tows.

Thus, the separation channels are formed between each pair of adjacent tows. The tows are preferably arranged in a relatively straight disposition, running parallel to each other in the length direction of the tape-like reinforcement, and consequently, the separation channels are also preferably arranged parallel to each other, and running in the longitudinal direction of the tape-like reinforcement. Thus, the new reinforcement may be referred to as a gapped reinforcement, or a Gapped UD (UniDirectional) tape/reinforcement.

The porous adhesive layer provides and maintains the parallel arrangement and integrity of the gapped UD tape-like reinforcement, and ensures that the tows and the separation channels are kept in place. The separation channels preferably have a relatively uniform width over the entire length. However, some variations in separation width are acceptable in most applications, and even occasional total closure of the separation channel may be acceptable for certain applications.

It has been found by the present inventors that by arranging the tows, separated by separation channels, a very versatile reinforcement is obtained. The porous adhesive layer provides a flexible and drapable reinforcement, which is yet stable and maintains its shape and properties during both manufacturing and subsequent handling and use. Further, the porous adhesive layer and the separation channels together provide very efficient flow paths for matrix or resin to infiltrate and spread within the reinforcement, and in structures formed by such reinforcements. They also enable easy and quick removal of entrapped air. This in turn quickens and improves the wetting of fibers by the matrix, and as a consequence the mechanical performance and quality of the composite material formed thereby. The infiltration of the resin also becomes very controllable by the provision of the infiltration paths, particularly by the widths of such paths, provided by the separation channels.

The filaments/fibers of the tows forming the at least one fiber/filament layer preferably comprise fibers of carbon, glass, ceramic, aramid, PBO and/or other high performance polymeric fibers. The tows may comprise the same or different fibers. Blends of such fibers may also be used in one or several of the tows. In particular, tows comprising or consisting of carbon fibers/filaments are preferred.

The separation channels preferably have a width in the range of 0.1-1.0 mm, and preferably in the range of 0.2-0.8 mm, and most preferably in the range 0.25-0.75 mm, such as 0.5 mm. However, it is not necessary to have a constant width of all the separation channels; they can be of different widths relative to each other and/or each such separation channel having varying width. It is of importance to have channels wide enough to allow a good infiltration and spreading of the resin. At the same time, too wide channels may result in pools of resin being formed, which deteriorates the resulting composite material. It has been found that channel widths exceeding 0.1 mm, and in particular 0.2 or 0.25, provide a very efficient infiltration/spreading of matrix/resin. At the same time, it has been found that using a maximum separation width of 1 mm, and preferably a maximum of 0.8, such as 0.75, is sufficient to hinder creation of pools/pockets of resin causing deterioration of the final product. Thus, it has been found that by using separation widths within any of these very specific ranges, a very efficient combination of quick and good infiltration and spreading of the resin, and thereby wetting of fibers/filaments, can be obtained together with good mechanical performance of composite materials.

The tows in the at least one fiber/filament layer preferably have a width in the range of 1-20 mm, and preferably in the range of 2-15 mm, and most preferably in the range of 2-10 mm, such as 5 mm. However, it is not necessary to have a constant width of all the tows; they can be of different widths relative to each other and/or each tow having varying width.

Similarly, it is preferred that the separation channels form a part of the overall volume of the tape-like reinforcement. Preferably, the combined volume of the separation channels in the one or several layer(s) of the tape-like reinforcement covers 1-20% of the entire volume of the tape-like reinforcement, and more preferably covers in the range of 1-15% of the entire volume, and most preferably covers in the range of 1-10%.

The tape-like reinforcement preferably has a width in the range of 1 cm to 2 m, and preferably in the range of 3 cm-1.5 m, and most preferably in the range of 10 cm-60 cm, such as 30 cm.

Each tow preferably comprises a number of filaments in the range of 1000-50,000, and preferably in the range of 1,000-25,000, and most preferably in the range of 3,000-24,000.

Tows or yarns, particularly when comprising carbon filaments, are often referred to and classified as e.g. 3 k, 6 k, etc. This is an indication of the number of fibers/filaments within each tow/yarn, where k means kilo (1000), whereby 3 k is 3000, etc. In the reinforcement of the present invention, each tow/yarn preferably has a count of 1 k, 2 k, 3 k, 6 k, 12 k, 15 k 18 k or 24 k, even though higher counts may also be used. Preferably, the count of each tow/yarn is in the range 6-15 k. Notably, different types and qualities of fibers have different densities and other properties. For example, carbon fibers are usually grouped according to the modulus band in which their properties fall. These bands are commonly referred to as: high strength (HS), standard modulus (SM), intermediate modulus (IM), high modulus (HM) and ultra high modulus (UHM). The filament diameter of most types is about 5-7 µm. Notably, a tow of 12 k HS has about the same cross-section area as a tow of 24 k IM, due to the finer filaments and higher density of the IM.

The porous adhesive layer, for attaching to the fiber/filament layer, may comprise an adhesive web or veil. The adhesive web may e.g. be a nonwoven web made of thermoplastic polymer or polymeric fibers or component of thermoset resin. In another aspect, the porous adhesive layer could be in the form of a suitable prepreg as well onto which fibers/filament layer formed by the separated tows can be directly laid.

The porous adhesive layer is preferably made of a hot melt thermoplastic, preferably comprising at least one of polyamide, polyester, polyolefin, polypropylene and polyurethane, and/or a component of an epoxy based material and preferably of fibrous type, or of a type resembling fibers.

Such adhesive layers may be webs/veils, made of nonwoven or woven material, and are per se known, and e.g. commercially available from companies such as Spunfab. Examples of such adhesive layers are also known from e.g. WO 03/064153, said document hereby being incorporated in its entirety by reference.

The porous adhesive layer may be arranged on one, or both sides of the fiber/filament layer(s). Further, a porous adhesive layer may be arranged between two separate fiber/filament layers. Still further, more complex structures are feasible, such as a five layer structure, comprising from one side a first outer adhesive layer, a first fiber/filament layer, a second intermediate adhesive layer, a second fiber/filament layer, and a third outer adhesive layer. Many other combinations are also feasible, as would be appreciated by the skilled addressee.

The purpose of the porous adhesive layer is to maintain the tows in the fiber/filament layer in a separated channel-forming configuration, and make the reinforcement stable enough to be easily handled. The adhesive layer is porous to allow infiltration by a matrix resin, and is also preferably flexible enough to provide drapability of the reinforcement. The adhesive layer may also be used for joining one reinforcement layer to other layer(s), of the same or different types. This e.g. makes it possible to use reinforcements of the above-discussed type instead of pre-pregs to lay up suitable shapes and structures.

It is also possible to provide the gapped UD reinforcement in the form of pre-pregs, i.e. in the form of a pre-impregnated reinforcement. In such an embodiment, the said reinforcements may be prepared by impregnating it with a component of the resin which is adapted to be activated, completing reaction during curing.

The porous adhesive layer adheres to the fiber/filament layer of the separated tows, by means of surface adhesion. However, it is not necessary for the adhesive layer to adhere directly to each filament/fibre of the tows in the filament layer(s). Instead, the filaments in the tows may be arranged to maintain a certain stability by other means, as is per se known in the art, such as by suitable sizing, inter-filament connections or entanglements, frictional forces between filaments etc.

According to a further aspect of the present invention, there is provided a multiaxial reinforcement comprising a plurality of substantially unidirectional fibrous reinforcement layers arranged in a sandwich construction, with the fiber direction of at least some of the reinforcement layers extending in different directions, wherein at least one of the reinforcement layers is a gapped UD tape-like dry fibrous reinforcement as discussed in the foregoing in relation to the first aspect of the invention.

By means of this aspect, the same or similar advantages and preferred features and embodiments as discussed above in relation to the first aspect are useable and obtainable.

Multiaxial reinforcements, also known as non-crimp fabrics (NCF) are fabrics made up of multiple plies of parallel fibers, each laying in a different orientation or axis. These layers are preferably stitch-bonded, e.g. with a polyester thread, to form a fabric. Such multiaxial reinforcements, mentioned earlier are suitable for use in composite structures, and effectively allow the composite manufacturer to process multiple layers of unidirectional fibers in a single fabric. The multiaxial reinforcement may e.g. comprise 2-20 layers, and preferably 2-10 layers, and most preferably 2-5 layers depending on the application demands.

The good infiltration properties of the above-discussed gapped UD reinforcement make it highly suitable for use with conventional NCF/multiaxial reinforcements, as it will enhance the overall infiltration properties of the multiaxial reinforcement/NCF.

The gapped UD reinforcement as discussed above is preferably used to form one or several layers of the multiaxial reinforcement/NCF by aligning it with the production direction of the fabric, i.e. the zero degree direction. The stability and integrity of the above-discussed gapped UD reinforcement makes it possible for its incorporation as one or several of the layers in the multiaxial reinforcement in a cost-effective and relatively simple way. Further, such a stable gapped UD reinforcement can be laid accurately and quickly in different orientations and lengths to produce specific parts using available laying-up machines. It may be noted that different widths of gapped UD reinforcement may as well be laid in any desired order and orientation to create the shape and dimensions of the required final composite part for obtaining its best mechanical performance.

In an alternative, the gapped UD reinforcement of the present invention may be combined with another conventional, and preferably stitched multiaxial/NCF or woven reinforcements. For example, the gapped UD reinforcement may be arranged on either one or both sides of such a conventional multiaxial reinforcement/NCF or woven fabric, or be sandwiched between two or more such conventional multiaxial reinforcements/NCFs or woven fabrics.

In another alternative, the new reinforcement, the gapped UD reinforcement, may be used as one of the layers in a desired orientation in a multiaxial reinforcement/NCF structure. In yet another alternative, the new reinforcement, the gapped UD reinforcement, may be used in forming a multiaxial reinforcement/NCF without stitching the plies of fiber/filament layers, as the integrity of such a new multiaxial reinforcement/NCF comes from heat bonding whereby kinks in tows arising from stitching are eliminated.

The gapped UD reinforcement may also be used on its own like a wrap, and/or to form braids over cores/mandrels. It may also be used as tapes to form warps and/or wefts in woven reinforcement fabrics or other types of interlaced reinforcements. For example, such tapes may be used in fabrics of the type disclosed in EP 1 838 909 and WO 12/098209 by the same applicant, said documents hereby incorporated in its entirety by reference. These fabrics may also be stacked or plied in desired order and combined with gapped UD reinforcement to obtain a new reinforcement structure.

When using the gapped UD reinforcement as tapes arranged in two or more directions, flow paths for matrix infiltration are also directly formed in such corresponding directions, which enables a very efficient infiltration and impregnation of fibers.

According to another aspect of the present invention, there is provided a fabric comprising two sets of tape-like reinforcements arranged in an interlaced or interconnected configuration, at least some of the tape-like reinforcements being tape like dry fibrous reinforcements of the above-discussed type, i.e. gapped UD reinforcement.

By means of this aspect, the same or similar advantages and preferred features and embodiments as discussed above in relation to the above-discussed aspects are useable and obtainable. It may be noted that use of gapped UD reinforcement enables its bonding upon heating and pressing with other layers of gapped UD reinforcements or fabrics or NCFs etc. described in the foregoing. As a result, relative displacement of such different material layers are significantly restricted during impregnation/infusion process leading to improved quality of composite parts besides lowering rejections.

According to a further aspect of the present invention, there is provided a method for obtaining a tape-like dry fibrous reinforcement, such as a reinforcement for composite material, comprising:

arranging tows in substantially unidirectional orientation alongside each other to form at least one fiber/filament layer, each tow comprising a plurality of substantially unidirectional fibers/filaments, wherein the tows of the at least one fiber/filament layer are separated from each other by separation distances;

providing a porous adhesive layer on at least one side of said fiber/filament layer; and attaching the porous adhesive layer to the fiber/filament layer by surface connection/adhesion by e.g. heating and/or pressing using suitable bonding agent.

By means of this aspect, the same or similar advantages and preferred features and embodiments as discussed above in relation to the above-discussed aspects of gapped UD tapes are useable and obtainable.

According to yet another aspect of the present invention, there is provided an apparatus for forming tape-like dry fibrous reinforcement, such as a reinforcement for composite material, comprising:

a separating device, for arranging the fibers/filaments in substantially unidirectional orientation alongside each other to form a fiber/filament layer comprising a plurality of tows, each tow comprising a plurality of substantially unidirectional filaments, wherein the tows of the at least one fiber/filament layer are separated from each other by separation distance;

an attachment or feeding device for supplying and laying a porous adhesive layer on at least one side of said layer of tows; and a heater or bonding agent applicator, preferably in combination with a pressing arrangement, for attachment of the porous adhesive layer to the fiber/filament layer by surface connection by heating or chemical bonding.

By means of this aspect, the same or similar advantages and preferred features and embodiments as discussed above in relation to the above-discussed aspects are useable and obtainable.

The separating device is preferably also operable to spread and widen incoming tows, provided from a tow supply, and arranging their filaments in substantially unidirectional orientation and arranging the tows alongside each other in the above-discussed gapped configuration.

The separating device may also comprise a plurality of pins, such as fingers, or slats or solid/annular discs or sheets/plates, preferably in a linear arrangement and protruding from a surface, between which the tows can pass/run, to form the separation distances between the tows. These pins/slats/discs etc. separate the tows in a comb-like fashion. The diameter of the pins or the thickness of the slats/discs is suitably pre-selected. The separating device is preferably arranged prior to the heater or bonding agent applicator, so as to enable the separated tows to be maintained in the wanted configuration when porous adhesive layer is applied over fiber/filament layer of tows for stabilizing by application of heat or bonding agent.

Additionally, other means may be used for maintaining the running tows in separated configuration for enabling application of the adhesive layer. For example, use of roller/s or drum/s covered with a frictional material, e.g. silicone, to maintain the running tows separated. It is also possible to maintain the running tows separated from each other by arranging their clamping, e.g. in-between two belts, preferably having frictional surfaces, e.g. like that of silicone. Such clamping or drum/roller arrangements may also be used in combination with heating or bonding agent application.

The heater may provide heat in different ways, such as by conduction, convection and radiation (e.g. by emission of infrared radiation, high frequency radiation, or ultrasonic radiation, or passing electrical current through the fibres) to the tows. In addition to heating, pressure may also be applied during this step to adhere the porous adhesive layer to the facing surface of the layer of tows.

The bonding agent applicator may supply and apply the suitable chemical formulation directly (e.g. licking action of a roller) or indirectly (e.g. spraying) to the running tows. Again, pressure may also be applied during this step.

During adhesion, the porous adhesive layer softens/melts on the heated tow to a certain extent, thereby forming an adhesive surface bond to the tows in the filament layer. However, heating is preferably controlled to avoid too deep penetration of the melt into the tows, thereby maintaining the separation channels open and avoiding collapse of the adhesive layer. Similarly, the porous adhesive layer is directly formed over the facing surface of the fiber/filament layer of running tows by the bonding agent applicator. Again, the application of bonding agent is preferably controlled to avoid filling in the gaps between the tows with the bonding agent, thereby maintaining the separation channels open.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION OF PREFERRED EMBODIMENTS

Figure 1:
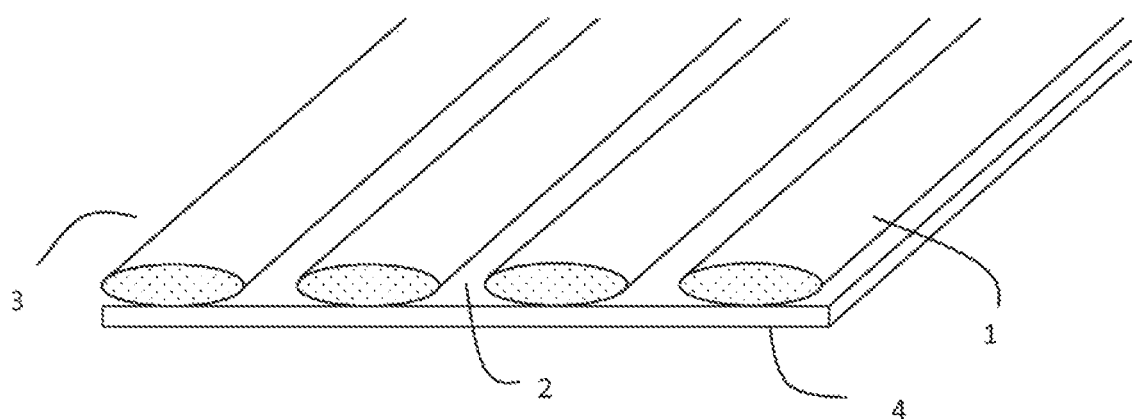
FIG. 1 is a schematic perspective view of a gapped UD tape-like reinforcement in accordance with an embodiment of the present invention.

In the following detailed description, preferred embodiments of the present invention will be described. However, it is to be understood that features of the different embodiments are exchangeable between the embodiments and may be combined in different ways, unless anything else is specifically indicated. It may also be noted that, for the sake of clarity, the dimensions of certain components illustrated in the drawings may differ from the corresponding dimensions in real-life implementations of the invention. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 2:
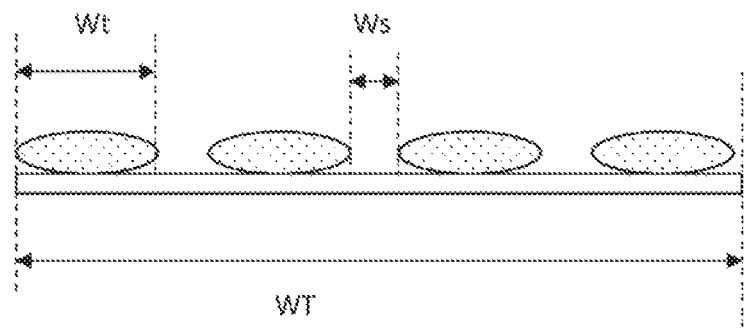
FIG. 2 is a cross-sectional view of the gapped UD tape-like reinforcement of FIG. 1.

In FIGS. 1 and 2 a gapped UD reinforcement tape in accordance with one embodiment is illustrated. The reinforcement forms a tape-like dry fibrous reinforcement comprising a plurality of tows 1, each comprising a plurality of unidirectional filaments, e.g. of carbon. The tows 1 form a fiber/filament layer 3 having a plurality of substantially unidirectionally oriented tows arranged alongside and separated from each other. The tows 1 are connected to a porous adhesive layer 4 by means of a surface bond.

The tows of the fiber/filament layer 3, connected by the porous adhesive layer 4, are separated from each other by separation channels 2.

The filaments/fibers of the tows forming the at least one fiber/filament layer preferably comprises fibers of one or more from a selection of carbon, glass, ceramic, aramid, PBO and/or other high performance polymeric fibers, or blends some or all of these fibers. In particular, filament layers comprising or consisting of carbon fibers are preferred.

The separation channels 2 preferably have a width Ws in the range of 0.1-1.0 mm, and preferably in the range of 0.2-0.8 mm, and most preferably in the range 0.25-0.75 mm, such as 0.5 mm. However, it is not necessary to have a constant width of all the separation channels; they can be of different widths relative to each other and/or each such separation channel having varying width. The tows 1 preferably have a width Wt in the range of 1-20 mm, and preferably in the range of 2-15 mm, and most preferably in the range of 2-10 mm, such as 5 mm. However, it is not necessary to have a constant width of all the tows; they can be of different widths relative to each other and/or each tow having varying width.

Similarly, it is preferred that the separation channels form a part of the overall volume of gapped UD tape-like reinforcement. Preferably, the combined volume of the separation channels covers 1-20% of the entire volume of the tape-like reinforcement, and more preferably covers in the range of 1-15%, or 2-15%, of the entire volume, and most preferably covers in the range of 1-10%, or 2-10%, or 3-10%.

The gapped UD reinforcement preferably has a width WT in the range of 1 cm-2 m, and preferably in the range of 3 cm-1.5 m, and most preferably in the range of 10 cm-60 cm, such as 30 cm.

Each tow preferably comprises a number of filaments in the range of 1000-50,000, and preferably in the range of 1,000-25,000, and most preferably in the range of 3,000-24,000.

Figure 3:
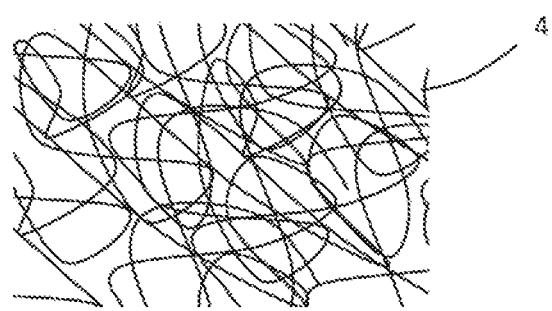
FIG. 3 is a top view of a porous adhesive layer in accordance with an embodiment of the present invention.

The porous adhesive layer is preferably an adhesive web. The adhesive web may e.g. be a nonwoven web made of thermoplastic or polymeric fibers, or fiber resembling structures. In another aspect, the porous adhesive layer could be in the form of a suitable prepreg as well onto which fibers/filament layer formed by the separated tows can be directly laid. The porous adhesive layer is preferably made of a hot melt thermoplastic material and preferably comprising at least one of polyamide, polyester, polyolefin, polypropylene and polyurethane and/or it is a thermoset epoxy based resin. An example of a part of a non-woven porous adhesive layer 4 produced by spun-bonding method is illustrated schematically in FIG. 3. Alternatively other types of adhesive layer may be used as well, such as woven adhesive layers, net-like adhesive layers and the like.

The adhesive layer 4 may be arranged on one, or both sides of the fiber/filament layer(s) of separated tows 3, or interleaved between layers of tows.

Figure 7A:
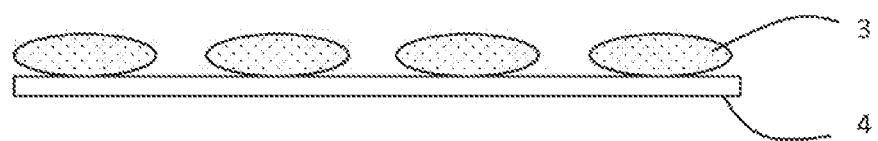
FIGS. 7a-7d are cross-section views of various embodiments of gapped UD tape-like reinforcements in accordance with the present invention.
Figure 7B:
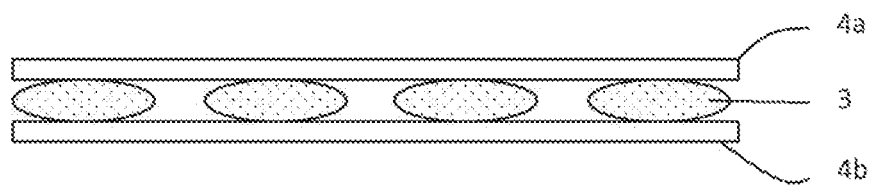
Figure 7C:
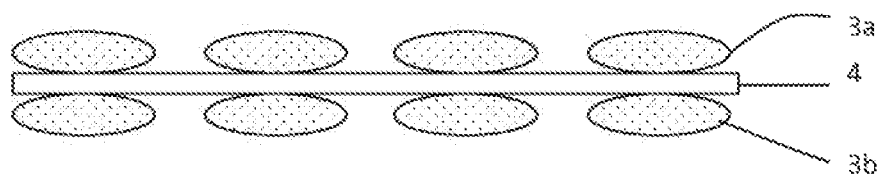
Figure 7D:
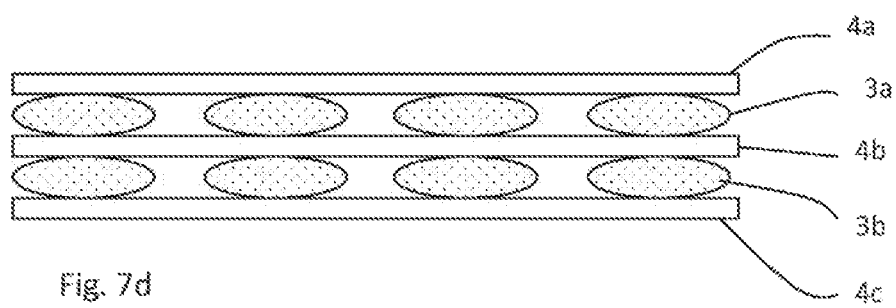

In the schematic embodiments of some different types of gapped UD tapes shown in FIG. 7, the reinforcement according to FIG. 7a comprises a porous adhesive layer 4 adhering to one side of a fiber/filament layer 3 of separated tows. In the schematic embodiment of FIG. 7b, a fiber/filament layer 3 of separated tows is sandwiched between upper and lower adhesive layers 4a and 4b. In the schematic embodiment of FIG. 7c, the adhesive layer 4 is sandwiched between two fiber/filament layers 3a and 3b of the corresponding separated tows. Seen differently, the adhesive layer 4 commonly adheres to the upper 3a and lower 3b layers of the corresponding separated tows. Finally, in the embodiment of FIG. 7d, a five layer structure is provided, comprising from top side, a first outer adhesive layer 4a, a first fiber/filament layer 3a of separated tows, a second intermediate adhesive layer 4b, a second fiber/filament layer 3b of separated tows, and a third outer adhesive layer 4c. Many other combinations are also feasible, as would be appreciated by the skilled addressee.

The gapped UD reinforcement tapes may be used to form woven fabrics, or other types of interlaced fabrics as well. The gapped UD reinforcement tapes may also be used for producing pre-pregs.

According to one embodiment, the gapped UD reinforcement is used to form a multiaxial reinforcement, such as a non-crimp fabric (NCF), comprising a plurality of substantially unidirectional fibrous reinforcement layers arranged in a sandwich construction, with the fiber direction of at least some of the reinforcement layers extending in different directions, and wherein at least one of the reinforcement layers is a gapped UD reinforcement. The layers are preferably stitch-bonded, e.g. with a polyester thread, to form a fabric. The gapped UD reinforcement may be integrated in the stitch-bonded reinforcement, or be provided on one or several surfaces, or as an intermediate layer, in relation to such stitch-bonded reinforcements.

Figure 4:
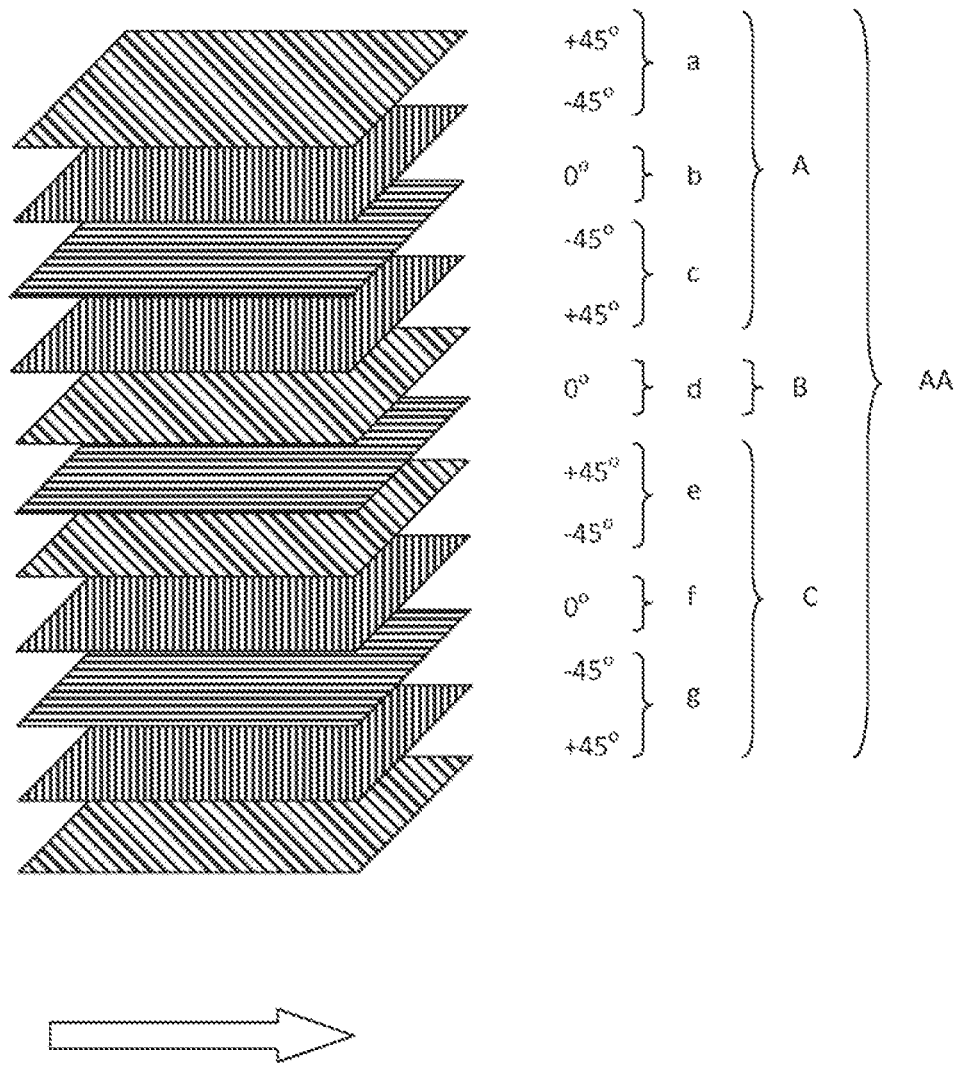
FIG. 4 is a schematic exploded view of an NCF material in accordance with the present invention, illustrating various embodiments.

One such embodiment is illustrated schematically in FIG. 4. In this embodiment, a plurality of reinforcement layers arranged in different orientations is provided. The layers are preferably arranged symmetrically about the centre plane. In this illustrative example, reinforcement layers are provided in zero-degree orientation, meaning that the filaments of the layer are orientated in line with the production direction and take-up direction (illustrated by the arrow), and +45 and −45 degree orientations. At least the reinforcement layers oriented in zero-degree direction are preferably of the above-discussed gapped UD reinforcement type.

FIG. 4 illustrates various possible configurations. In one alternative, the +45 and −45 degrees oriented reinforcement layers are arranged as conventional NCFs a, c, e and g, with the gapped UD reinforcements b, d and f oriented in the zero-degree direction between them (i.e. between a, c, e and g). Alternatively, a-c may form a first stitched NCF A, and e-g may form a second stitched NCF C, with the intermediate layer B of gapped UD reinforcement being sandwiched in between them (i.e. between A and C). In yet another alternative, all layers a-g may be arranged in a single NCF AA.

A person skilled in the art can understand now that many other combinations are feasible, including more or fewer layers, and also gapped UD reinforcement layers oriented in other directions.

Exemplary embodiments for production of the gapped UD reinforcement will now be described in reference to FIG. 5.

Figure 5A:
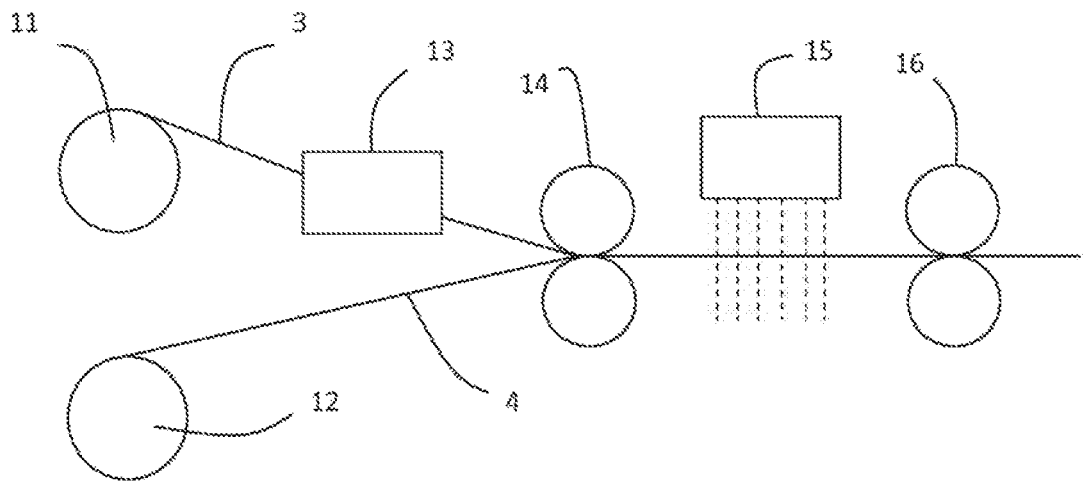
FIG. 5 is a schematic illustration of two different embodiments, FIGS. 5a and 5b, respectively, of an apparatus for producing a gapped UD tape-like reinforcement, in accordance with embodiments of the present invention.
Figure 6:
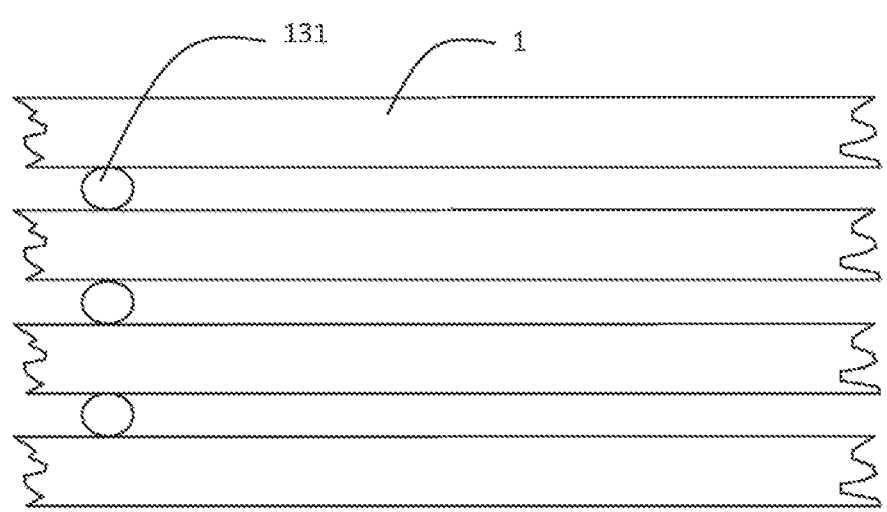
FIG. 6 is a more detailed view of a device for obtaining separation between the tows.

In a first embodiment, illustrated in FIG. 5a, the filaments of a tow are first separated, and preferably spread, so that the tows arranged in substantially unidirectional orientation alongside each other to form a fiber/filament layer of tows, each tow comprising a plurality of substantially unidirectional filaments, wherein the tows forming the at least one layer are separated from each other by an separation distance. Such a gapped UD reinforcement tape may be produced in a separating device 13. The separating device 13 separates and spreads filaments of tows provided by bobbins 11 from a creel into individual spread tows and maintains the individual spread tows separated from each other through use of a plurality of pins or slats 131 protruding from a surface with which the spread tows are in contact with and occur in between the spread tows 1, as illustrated in FIG. 6, forming an intermediate fiber/filament layer of tows separated by a required distance. The arrangement of plurality of protruding pins/slats thus separates the tows in a comb-like fashion.

Additionally, other means may be used for maintaining the running tows in separated configuration for enabling application of the adhesive layer. For example, use of roller/s or drum/s covered with a frictional material, e.g. silicone, to maintain the running tows separated. It is also possible to maintain the running tows separated from each other by arranging their clamping, e.g. in-between two belts. Such clamping or drum/roller arrangements may also be used in combination with heating or bonding agent application.

Together while supplying tows from the bobbins 11, a porous adhesive layer 4 is also supplied from one or more roll/s 12.

The porous adhesive layer(s) 4 and the fiber/filament layer(s) 3 comprising the separated tows are brought together, for example by means of suitable guides 14, e.g. comprising a pair of guide rollers. A heater or a bonding agent applicator 15 is provided and suitably arranged next. The heater applies heat to the combined layers 3 and 4 of tows and adhesive.

The heater may provide heat in different ways, such as by conduction, convection and radiation (e.g. by emission of infrared radiation, high frequency radiation, or ultrasonic radiation) to the tows. In addition to heating, pressure may also be applied during this step to adhere the porous adhesive layer to the facing surface of tows.

The bonding agent applicator may supply and apply the suitable chemical formulation directly (e.g. licking action of a roller) or indirectly (e.g. spraying) to the running tows. Again, pressure may also be applied during this step.

The produced gapped UD reinforcement is then advanced continually by the advancing device 16 and wound into a spool, or other suitable package by the winding unit (not shown) for subsequent use.

Figure 5B:
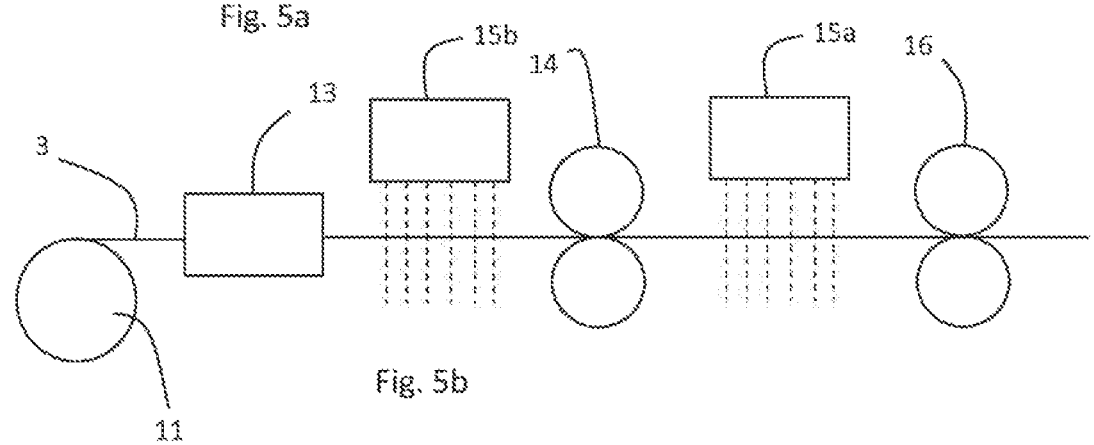

In the second embodiment of the production apparatus, illustrated in FIG. 5b, the supply of porous adhesive web 12 has been replaced by a bonding agent applicator 15b, providing the adhesive web 4 directly on top of the separated tows of the fiber/filament layer 3. The bonding agent applicator may provide the porous adhesive web by spraying a melted thermoplastic or epoxy based thermoset over the fiber/filament layer. Apart from these differences, the remaining parts of the apparatus of FIG. 5b remain the same as in the embodiment of FIG. 5a.

The invention has now been described with reference to specific embodiments. However, several variations of the reinforcement, and the method and apparatus for production, are feasible. For example, the reinforcement may have more or fewer layers, having various size and compositions, and the method and apparatus may apply heat, bonding agent etc. in various ways and sequences. Further, the order of the manufacturing steps may be performed somewhat differently, for example to some extent step-wise or simultaneously.

Such and other obvious modifications must be considered to be within the scope of the present invention, as defined by the appended claims. It should be noted that the above-mentioned embodiments illustrate rather than limit the invention, and that those skilled in the art will be able to design many alternative embodiments without departing from the spirit and scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements. Further, a single unit may perform the functions of several means recited in the claims.

The invention claimed is:

1. A tape-like dry fibrous reinforcement comprising at least one fiber layer, each fiber layer comprising a plurality of fiber tows arranged substantially unidirectionally in a mutually parallel arrangement alongside each other, each tow comprising a plurality of unidirectional fibers or filaments, and at least one porous adhesive layer attached to the tows of at least one fiber layer by surface connection, wherein the tows of the at least one fiber layer are separated from each other, thereby forming separation channels, wherein the separation channels have a width in the range of 0.1-1.0 mm, and wherein the separation channels form a part of the overall volume of the tape-like reinforcement whereby the combined volume of the separation channels in the tape-like reinforcement covers 1-20% of the total volume of the tape-like reinforcement.

2. The tape-like dry fibrous reinforcement of claim 1, wherein the fiber tows of said at least one fiber layer comprise fibers/filaments of at least one of carbon, glass, ceramic, aramid, PBO and/or other high performance polymeric fibers, or blends of some or all of these fibers.

3. The tape-like dry fibrous reinforcement of claim 1, wherein the separation channels have a width in the range of 0.2-0.8 mm.

4. The tape-like dry fibrous reinforcement of claim 1, wherein the tows have a width in the range of 2-15 mm.

5. The tape-like dry fibrous reinforcement of claim 1, wherein the separation channels form a part of the overall volume of the tape-like reinforcement whereby the combined volume of the separation channels in the tape-like reinforcement covers 1-10% of the total volume of the tape-like reinforcement.

6. The tape-like dry fibrous reinforcement of claim 1, wherein the reinforcement has a width in the range of 10 cm-60 cm.

7. The tape-like dry fibrous reinforcement of claim 1, wherein each tow comprises a number of filaments in the range of 1000-25,000.

8. The tape-like dry fibrous reinforcement of claim 1, wherein the porous adhesive layer comprises an adhesive web.

9. The tape-like dry reinforcement of claim 1, wherein the porous adhesive layer comprises a hot melt thermoplastic.

10. A multiaxial reinforcement comprising a plurality of substantially unidirectional fibrous reinforcement layers arranged in a sandwich construction, with the fiber direction of at least some of the reinforcement layers extending in different directions, wherein at least one of the reinforcement layers is a tape-like dry fibrous reinforcement in accordance with claim 1.

11. The multiaxial reinforcement of claim 10, wherein the multiaxial reinforcement is a stitched non-crimp fabric.

12. A fabric comprising two sets of tape-like reinforcements arranged in an interlaced or interconnected configuration, at least some of the tape-like reinforcements being tape like dry fibrous reinforcements in accordance with claim 1.

13. A method for obtaining the tape-like dry fibrous reinforcement according to claim 1 comprising:
arranging tows in substantially unidirectional orientation alongside each other to form at least one fiber/filament layer, each tow comprising a plurality of unidirectional fibers/filaments, wherein the tows of the at least one fiber/filament layer are each separated by separation distance, wherein the separation channels have a width in the range of 0.1-1.0 mm, and wherein the separation channels form a part of the overall volume of the tape-like reinforcement whereby the combined volume of the separation channels in the tape-like reinforcement covers 1-20% of the total volume of the tape-like reinforcement;
providing a porous adhesive layer on at least one side of said fiber/filament layer; and
attaching the porous adhesive layer to the fiber/filament layer by surface connection, for example by heating, by use of a suitable bonding agent and/or pressing.

14. An apparatus for forming the tape-like dry fibrous reinforcement according to claim 1 comprising:
a separating device, for arranging fibers/filaments in substantially unidirectional tows alongside each other to form a fiber/filament layer, each tow comprising a plurality of unidirectional filaments, wherein the tows of the at least one filament layer are each separated by separation distance, wherein the separation distance forms separation channels having a width in the range of 0.1-1.0 mm, and wherein the separation channels form a part of the overall volume of the tape-like reinforcement whereby the combined volume of the separation channels in the tape-like reinforcement covers 1-20% of the total volume of the tape-like reinforcement;

an attachment or feeding device for laying a porous adhesive layer on at least one side of said fiber/filament layer; and a heater or bonding agent applicator for attaching the porous adhesive layer to the fiber/filament layer by surface connection by heating or chemical bonding.

15. The apparatus of claim 14, wherein the separating device comprises a plurality of pins or slats protruding in between the tows to form the separation distances.

16. The tape-like dry reinforcement of claim 1, wherein the porous adhesive layer is a nonwoven web made of hot melt thermoplastic.

17. A tape-like dry fibrous reinforcement comprising at least one fiber/filament layer having a plurality of fibers/filaments arranged in a plurality of substantially unidirectional tows arranged alongside each other, each tow comprising a plurality of unidirectional fibers or filaments, and at least one porous adhesive layer attached to the tows of at least one fiber/filament layer by surface connection, wherein the tows of the at least one fiber/filament layer are separated from each other by separation channels, wherein each tow comprises a number of filaments in the range of 1,000-25,000, and wherein the porous adhesive layer is a nonwoven web made of hot melt thermoplastic.

18. The tape-like dry reinforcement of claim 1, wherein each separation channel have a relatively uniform width over its entire length.

* * * * *